G. W. N. YOST.
Harvesters.
No. 137,814.            Patented April 15, 1873.
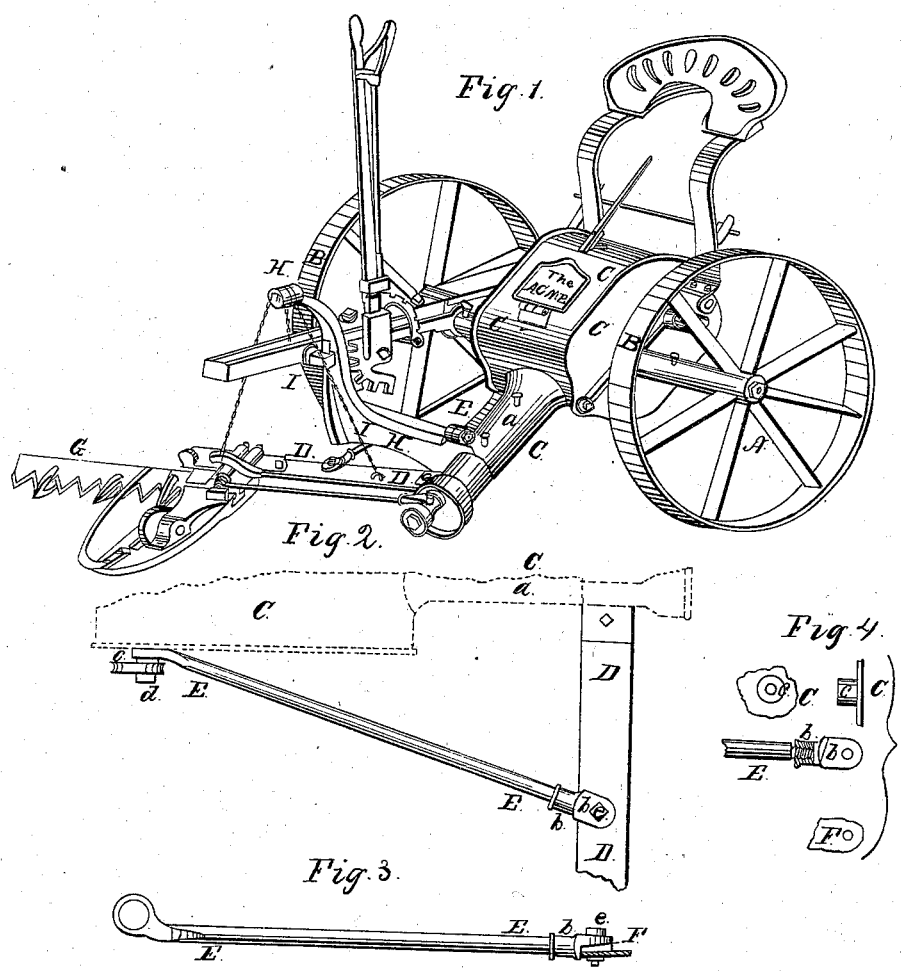

UNITED STATES PATENT OFFICE.

GEORGE W. N. YOST, OF CORRY, PENNSYLVANIA, ASSIGNOR TO "ACME MOWER AND REAPER COMPANY," OF NEW YORK, N. Y.

IMPROVEMENT IN HARVESTERS.

Specification forming part of Letters Patent No. 137,814, dated April 15, 1873; application filed September 23, 1872.

*To all whom it may concern:*

Be it known that I, GEORGE W. N. YOST, of Corry, Pennsylvania, have invented an Improved Mowing and Reaping Machine, which I call the "Acme," of which the following is a specification:

That part of the invention included in this division, and to which the application for a patent therefor is confined, is an improved connecting-frame. The nature of the invention is in combining a brace-bar with a connecting-bar by a compound elastic and screw-joint.

The accompanying drawing and the following description thereof fully illustrate the invention.

Of the drawing, Figure 1 represents a view of my improved mowing-machine; Fig. 2 represents a view of the connecting-frame; and Figs. 3 and 4 represent views of detached parts of the connecting-frame.

The description is as follows: A represents a main axle of a mowing or reaping machine. B represents a driving-wheel on each end of the main axle A. C represents an inclosing-box main frame, hinged on the main axle A between the driving-wheels B. *a* represents a neck or projection or end of the main frame C. D represents a connecting-bar hinged on the outer end of the neck of the main frame C, and extended laterally parallel with the main axle A out beyond a driving-wheel, B. E represents a brace-bar hinged on the side of the main frame C, near the end opposite to the connecting-bar D, and extended under the main axle A at as large an angle as may be between the contiguous driving-wheel B and the main frame, and attached to the connecting-bar. *b* represents a screw-socket blade on the brace-bar E, at the end next to the connecting-bar D, the blade part of which is flat, and adapted to lie on the connecting-bar, and in the periphery of the tube of the socket part of which is a screw, corresponding with a like screw on the end of the brace-bar. F represents a piece of caoutchouc, between the blade part of the screw-socket blade of the brace-bar E and the connecting-bar D, to allow the brace-bar to rock and vibrate on the connecting-bar in a direction transverse to the main axle A. *c* represents a hinge-lug, attached to the main frame C, on which one end of the brace-bar E is hinged to the main frame. *d* represents a screw-washer, against the hinge-lug *c* on the main frame C, to hold the brace-bar E on the hinge-lug. *e* represents a screw-bolt, through the blade part of the socket-screw blade *b* of the brace-bar E, and through the caoutchouc F, and through the connecting-bar D, to fasten the brace and connecting-bars together. G represents a finger-bar, hinged to the outer end of the connecting-bar D. H represents a horn or arm, rigidly attached to the main frame C at the end next to the connecting-bar D, and extended outwardly and above the connecting-bar. I represents a cord or chain, attached to the connecting-bar D between the main frame C and the finger-bar G, and also attached to the arm H.

The combination of the brace-bar E with the connecting-bar D makes a connecting-frame which connects the finger-bar G with the main frame C.

The hinge of the brace-bar E on the main frame C is parallel with the main axle A, which allows the hinge-lug *c* to be a solid integral part of the side of the main frame, and it is thereby enabled to sustain any required force applied to the brace-bar.

The hinge of the connecting-bar D on the main frame C is at a right angle to the main axle A, and therefore transverse to the hinge of the brace-bar on the main frame; hence, when the connecting-frame D E, at the point of connection with the finger-bar G, rises or falls above or below a horizontal line, the connecting-bar D and the brace-bar E tend to diverge, and were they rigidly attached together the connecting-frame would be inoperative, as then it could not vibrate up and down; but the screw-joint between the brace-bar and the screw-socket blade thereof enables the brace-bar to turn in the screw-socket, and to lengthen or shorten, as the outer end of the connecting-frame rises or falls; and the caoutchouc F, between the connecting-bar and the blade of the end of the brace-bar, allows a sufficient rocking to enable the connecting-frame to vibrate sufficiently, and maintain the joint intact.

The following is a summary of that part of the invention included in this division:

I claim—

The arrangement of the screw-socket joint with the elastic joint at the junction of and between the connecting-bar hinged to the main frame on a journal at a right angle to the main axle, and the brace-bar hinged to the main frame on a journal parallel with the main axle of a mowing-machine, substantially as described.

G. W. N. YOST.

Witnesses:
CHARLES BIRD,
JAMES DENSMORE.